Figure 1:
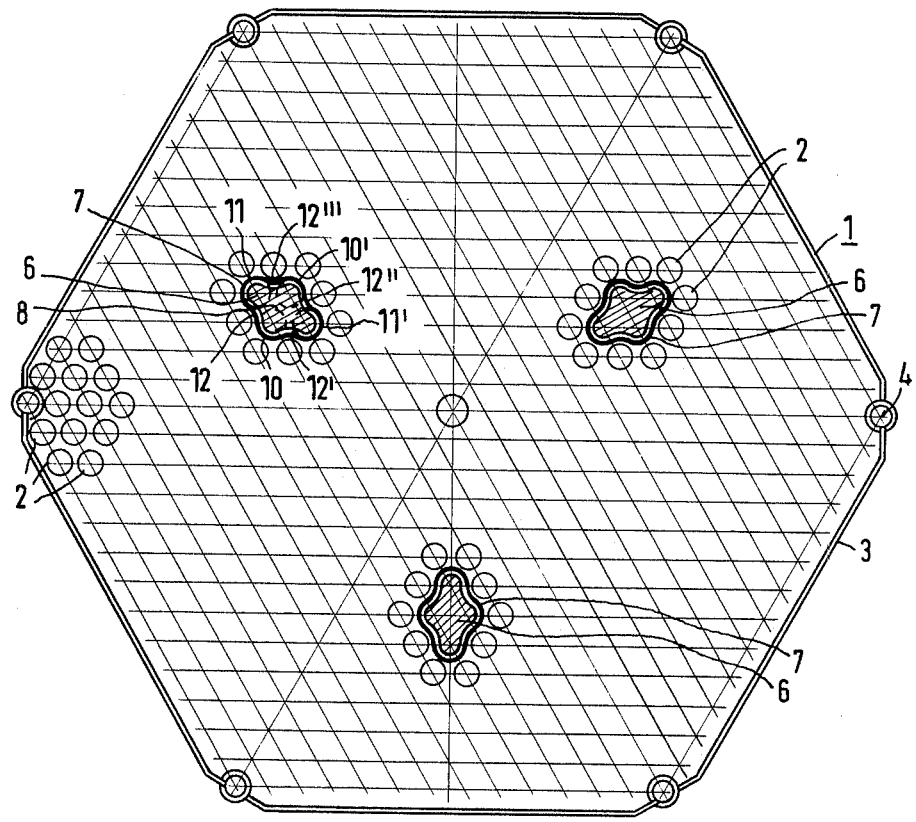

United States Patent [19]

Rau et al.

[11] Patent Number: 4,486,384
[45] Date of Patent: Dec. 4, 1984

[54] FUEL ASSEMBLY FOR A NUCLEAR REACTOR

[75] Inventors: Peter Rau, Mittelehrenbach; Manfred Schatz, Nuremberg, both of Fed. Rep. of Germany

[73] Assignee: Kraftwerk Union Aktiengesellschaft, Mülheim, Fed. Rep. of Germany

[21] Appl. No.: 240,253

[22] Filed: Mar. 3, 1981

[30] Foreign Application Priority Data

Mar. 5, 1980 [DE] Fed. Rep. of Germany ....... 3008442

[51] Int. Cl.³ ............................................. G21C 1/04
[52] U.S. Cl. .................................... 376/353; 376/434; 376/449
[58] Field of Search ............... 376/327, 333, 353, 449, 376/434

[56] References Cited

U.S. PATENT DOCUMENTS 3,407,117 10/1968 Lichtenberger .................... 376/353
3,574,059 4/1971 Södergand ......................... 376/327

FOREIGN PATENT DOCUMENTS 1482788 8/1977 United Kingdom ............... 376/327

*Primary Examiner*—Donald P. Walsh
*Attorney, Agent, or Firm*—Herbert L. Lerner; Laurence A. Greenberg

[57] ABSTRACT

Fuel assembly for a nuclear reactor having a bundle of fuel rods of circular cross section extending parallel to one another and disposed at positions forming a raster, including a guide tube for a control rod extending parallel to the fuel rods in the bundle and occupying the positions for and having a cross section covering the cross section of a plurality of mutually adjacent fuel rods in the raster the cross section of the guide tube being defined by circular arcs conforming with those of the circular cross section of the adjacent fuel rods covered thereby and being connected by concave arcuate sections.

4 Claims, 2 Drawing Figures

FUEL ASSEMBLY FOR A NUCLEAR REACTOR

The invention relates to a fuel assembly for a nuclear reactor having a bundle of fuel rods of circular cross section extending parallel to one another and disposed at positions which form a raster or grid and a guide tube for a control rod which extends parallel to the fuel rods in the bundle and has a cross section which covers the cross section of several adjacent fuel rods in the raster.

In a heretofore known fuel assembly having a square cross section and an accordingly square raster, the guide tube occupies the position or space of four mutually adjacent fuel rods. It has a circular cross section for accommodating a cylindrical control rod.

It is an object of the invention to provide means for improving the effectiveness of the control rods in the fuel assembly without using more space in the fuel assembly for this purpose, because the control rod contributes only slightly to the desired heat development.

With the foregoing and other objects in view there is provided, in accordance with the invention, a fuel assembly for a nuclear reactor having a bundle of fuel rods of circular cross section extending parallel to one another and disposed, at positions forming a raster, comprising a guide tube for a control rod extending parallel to the fuel rods in the bundle and occupying the positions for and having a cross section covering the cross section of a plurality of mutually adjacent fuel rods in the raster, the cross section of the guide tube being defined by circular arcs conforming with those of the circular cross section of the adjacent fuel rods covered thereby and being connected by concave arcuate sections. Through this accommodation or conformation to the cross section of the fuel rods otherwise mounted at the positions in the raster, the corners existing in the prior art constructions between the square raster of the fuel assembly and the circular guide tube having twice the diameter of the fuel rod are avoided. The invention is, moreover, especially advantageous if the fuel rods are to be braced against one another, because such bracing is possible also against the guide tube without requiring any changes in the ribs or the like provided for the bracing.

In a fuel assembly according to the invention, at least some arcs should comprise a semicircle in order to obtain a slim shape wherein the self-shielding effect of the absorber material forming the control rod is slight.

In accordance with an added feature of the invention, for fuel assemblies having an hexagonal cross section, it is especially advantageous when all of the circular arcs subtend a sector angle of at least 60°.

In accordance with a concomitant feature of the invention, the concave arcuate sections have a curvature equal to that of the circular arcs. A steady transition is thereby attainable in a relatively simple manner, which is advantageous from a mechanical point of view. In addition, in producing the embodiments of the invention, one can adapt also to practicalities in the manufacture of the guide tubes, for which heretofore known fabrication processes such as drawing, rolling or the like can be taken into consideration.

Other features which are considered as characteristic for the invention are set forth in the appended claims.

Although the invention is illustrated and described herein as embodied in a fuel assembly for a nuclear reactor, it is nevertheless not intended to be limited to the details shown, since various modifications and structural changes may be made therein without departing from the spirit of the invention and within the scope and range of equivalents of the claims.

Figure 2:
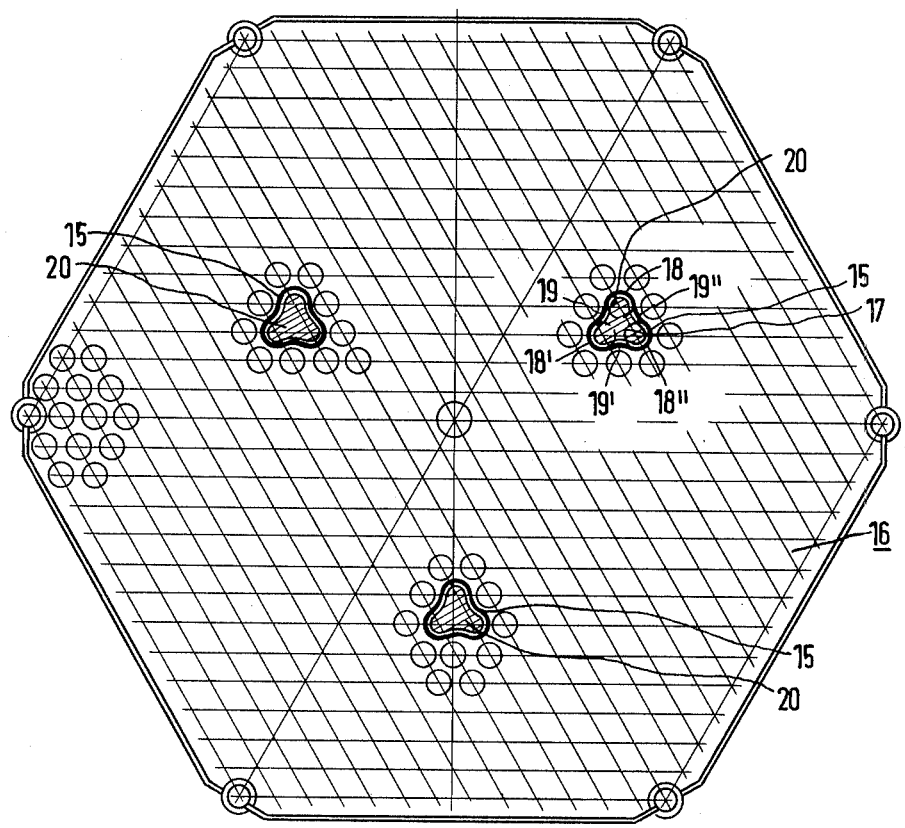

The construction and method of operation of the invention, however, together with additional objects and advantages thereof will be best understood from the following description of specific embodiments when read in connection with the accompanying drawings, in which:

FIGS. 1 and 2 are respective diagrammatic cross-sectional views of an hexagonal fuel assembly for an up-converter reactor with water cooling illustrating different embodiments of the invention.

Referring now to the drawing and first, particularly, to FIG. 1 thereof, there is shown a fuel assembly 1 having two hundred seventeen fuel rods 2 of circular cross section which are arranged in a regular hexagonal raster or grid as shown. The fuel rods 2 are made up of cylindrical cladding tubes of steel forming a tight enclosure for ceramic uranium oxide pellets. They are braced against one another by non-illustrated wire helices or coils or by integral ribs which extend along the length thereof, as well as against binding bands or wrappings 3 which are distributed over the length of the fuel assembly 1 and are spaced from one another by support rods 4.

Associated with fuel assembly 1 in the threefold vector-symmetrical arrangement shown, are three identical control rods 6 having neutron-absorbing material. The control rods 6 are movable in longitudinal direction of the fuel assembly i.e. into and out of plane of the drawing in FIG. 1, in guide tubes 7 which have the double-symmetrical cross section evident from FIG. 1. This cross section covers the positions 8, indicated by shading, that might otherwise be occupied by four adjacent fuel rods.

The outer contour of the guide tube 7 corresponds or conforms, respectively, with pairwise identical and mutually opposing circular arcs 10, 10' and 11, 11' to the cross sections of the "replaced" fuel rods 8. The circular arcs 10, 10' extend over a sector angle of 120°, while the circular arcs 11, 11' extend over sector angles of 180° and thus form a semi-circle.

Between the circular arcs 10, 11 which conform with the fuel rods 2, the guide tube 7 is realized in the form of four identical concave arcuate sections 12, 12', 12", 12'''. These arcuate sections, which extend over a sector angle of 60°, have the same curvature as the circular arcs 10, 10', 11 and 11'. In other words, the radius or curvature corresponds to the radius of the fuel rod cladding tubes including the wire helix or ribs serving for spacing.

In the embodiment according to FIG. 1, three cladding tubes 7 with control rods 6 are distributed uniformly over the cross section of the fuel assembly i.e. each second one of the equilateral triangles forming the fuel assembly cross section contains a guide tube. However, this construction is not essential to the invention.

In the embodiment according to FIG. 2, the cross section of the guide tubes 15, which are associated with an hexagonal fuel assembly 16 otherwise conforming with that of FIG. 1, covers an area otherwise occupiable three adjacent fuel rods as indicated at 17 by shading. Thereat, the cross section of the guide tube 15 is formed of three identical circular arcs 18, 18' and 18" which conform with the fuel rod cross section including the aforementioned spacer elements therefor, and which extend over arcs of 180° each. These circular arcs are connected by concave arcuate sections 19, 19' and 19" of the same curvature, which, respectively, extend over 60°. The control rod 20 enclosed by the guide tubes 15, just as in FIG. 1, has a geometrically similar cross section.

The figures clearly illustrate that a fine distribution of the control rods with the absorber material thereof is achieved with the construction according to the invention, so that the self-shielding effect is small. In addition, the fuel rods can be braced without any changes in the guide tubes as though fuel rods were located thereat.

We claim:

1. Fuel assembly for a nuclear reactor having a bundle of fuel rods of circular cross section extending parallel to one another and disposed at positions forming a raster, comprising an outer guide tube for receiving therein a control rod extending parallel to the fuel rods in the bundle and occupying the positions for and having a cross section completely covering the combined cross section of a plurality of mutually adjacent fuel rods in the raster, the cross section of said guide tube being defined by a plurality of circular arcs conforming with those of the circular cross section of the adjacent fuel rods covered thereby and being connected by a plurality of concave arcuate sections.

2. Fuel assembly according to claim 1 wherein at least one of said circular arcs comprises a semicircle.

3. Fuel assembly according to claim 1 or 2 wherein the fuel assembly has an hexagonal cross section, and wherein said circular arcs subtend a sector angle of at least 60°.

4. Fuel assembly according to claim 1 wherein said concave arcuate sections have a curvature equal to that of the circular arcs.

* * * * *